United States Patent

Siemers

Patent Number: 6,061,367
Date of Patent: May 9, 2000

[54] PROCESSOR WITH PIPELINING STRUCTURE AND METHOD FOR HIGH-SPEED CALCULATION WITH PIPELINING PROCESSORS

[75] Inventor: Christian Siemers, Heide, Germany

[73] Assignee: Siemens Aktiengesellschaft, Munich, Germany

[21] Appl. No.: 08/918,282

[22] Filed: Aug. 25, 1997

[30] Foreign Application Priority Data

Aug. 23, 1996 [DE] Germany .................. 196 34 031

[51] Int. Cl.[7] ............................................ H04J 3/04
[52] U.S. Cl. ................................ 370/535; 712/33
[58] Field of Search ........................... 370/531, 535, 370/536, 440; 712/200, 215, 208, 236, 33

[56] References Cited

U.S. PATENT DOCUMENTS

| | | | |
|---|---|---|---|
| 5,361,373 | 11/1994 | Gilson | 395/800 |
| 5,485,629 | 1/1996 | Dulong | 395/800 |
| 5,559,975 | 9/1996 | Christie et al. | 395/375 |

FOREIGN PATENT DOCUMENTS

| | | | |
|---|---|---|---|
| 0 417 861 A2 | 3/1991 | European Pat. Off. . | |
| 196 14 991 A1 | 10/1996 | Germany . | |
| 96/25706 | 8/1996 | WIPO . | |

OTHER PUBLICATIONS

"The Microarchitecture of Superscalar Processor"(smith et al.), Proceedings of the IEEE, pp. 1609–1624, Dec. 1995.
"TP5000:Reconfigurable Hardware Accelerator for CAD Applications" (Shimoguri et al.), 2311 Fujitsu Scientific & Technical Journal No. 2, Dec. 1995, pp. 152–160.
"Computer Architecture and Parallel Processing" (Hwang et al.), ISBN 0-07-031555-6, 1984, pp. 193–203.
"The Microarchitecture of Superscalar Processors" (Smith et al.), Proceedings of the IEEE, vol. 83, No. 12, Dec. 1995, pp. 1609–1624.
"Compiler Technology for Future Microprocessors" (Hwu et al.), Proceedings of the IEEE, vol. 83, No. 12, pp. 1625–1640.
"High–Performance Computing Using a Reconfigurable Accelarator" (Hartenstein et al.), Concurrency: Practice and Experience, vol. 8(6), Aug. 1996, pp. 429–443.

*Primary Examiner*—Chau Nguyen
*Assistant Examiner*—Kim T. Nguyen
*Attorney, Agent, or Firm*—Herbert L. Lerner; Laurence A. Greenberg; Werner H. Stemer

[57] ABSTRACT

A processor having a pipelining structure, in particular with a superscalar architecture, includes a configurable logic unit, an instruction memory, a decoder unit, an interface device, a programmable structure buffer, an integer/address instruction buffer and a multiplex-controlled s-paradigm unit linking contents of an integer register file to a functional unit with programmable structures and having a large number of data links connected by multiplexers. The s-paradigm unit has a programmable hardware structure for dynamic reconfiguration/programming while the program is running. The functional unit has a plurality of arithmetic units for arithmetic and/or logic linking of two operands on two input buses to produce a result on an output bus, a plurality of compare units having two input buses and one output bit, a plurality of multiplexers having a plurality of input buses and one or two output buses and being provided between the arithmetic units, the compare units and the register file, and a plurality of demultiplexers having one input bit and a plurality of output bits. A method is also provided for high-speed calculation with pipelining.

6 Claims, 9 Drawing Sheets

```
int a, b;
if ( a > 0 )
    b = a;
else
    b = 0;
```

Fig.5(b)

```
     mov r0, a;
     mov r1, b;
     mov r2, 0;
     cmp r0, 0;    COMPARISON
     ble L1   ;    CONDITIONED JUMP
     mov r2, r0;   only for a > 0!
L1:  mov b, r2;
```

Fig.5(c)

```
mov r0, a;
mov r1, b;
pgt r0, 0, p1;      set p1
movp r2, r0, p1;    only for a > 0!
movp r2, 0, /p1;    for a <= 0
mov b, r2;
```

Fig.7

```
int a [ LIMIT ], b [ LIMIT ] ;
int i, n;

for ( i = 0; i < n; i ++ )
{
    if ( a [ i ] != 0 )
        b [ i ] = b [ i ] + b [ i + 1 ] ;
    else
        b [ i ] = 0;
}
```

Fig.8

| LABEL | No. | INSTRUCTION |        | CYCLE |   | REGISTER CONTENTS |
|-------|-----|-------------|--------|-------|---|-------------------|
| L0:   |     | mov   | r2, 0          |       |   |                   |
|       |     | mul   | r6, n, 4       |       |   |                   |
|       |     | add   | r0, b, 4       |       |   |                   |
| L1:   | 1   | ld    | r1, mem ( a + r2 ) | 0 | 2 | r0 = & b [ 1 ]    |
|       | 2   | beq   | r1, 0, L3      |       |   | r1 = a [ i ]      |
| L2:   | 3   | ld    | r3, mem ( b + r2 ) | 2 |   | r2 = i * 4        |
|       | 4   | ld    | r4, mem ( r0 + r2 ) | 2 |  | r3 = b [ i ]      |
|       | 5   | add   | r5, r4, r3     | 4     |   | r4 = b [ i + 1 ]  |
|       | 6   | st    | mem ( b + r2 ), r5 | 5 |   | r5 = b [ i ] + b [ i + 1 ] |
|       | 7   | jmp   | L4             | 5     |   | r6 = n * 4        |
| L3:   | 8   | st    | mem ( b + r2 ), 0 |    |   |                   |
| L4:   | 9   | add   | r2, r2, 4      | 5     |   |                   |
|       | 10  | blt   | r2, r6, L1     | 6     |   |                   |

| LABEL | No. | INSTRUCTION | | CYCLE |
|---|---|---|---|---|
| L0: | | mov | r2, 0 | |
| | | mu1 | r6, n, 4 | |
| | | add | r0, b, 4 | |
| L1: | 1 | 1d | r1, mem ( a + r2 ) | 0 |
| | 3 | 1d | r3, mem ( b + r2 ) | 0 |
| | 4 | 1d | r4, mem ( r0 + r2 ) | 0 |
| | 5 | add | r5, r4, r3 | 2 |
| | 2 | pne | p1, r1, 0 | 2 |
| | 6 | stp | mem ( b + r2 ), r5 ( p1 ) | 3 |
| | 8 | stp | mem ( b + r2 ), 0 ( /p1 ) | 3 |
| | 9 | add | r2, r2, 4 | 3 |
| | 10 | b1t | r2, r6, L1 | 4 |

Fig.12

| LABEL | No. | INSTRUCTION | | CYCLE |
|---|---|---|---|---|
| L0: | | mov | r2, 0 | |
| | | mov | r7, 4 | |
| | | mu1 | r6, n, 4 | |
| | | add | r0, b, 4 | |
| L1: | 1 | 1d | r1, mem ( a + r2 ) | 0 |
| | 21 | 1d | r8, mem ( a + r7 ) | 0 |
| | 3 | 1d | r3, mem ( b + r2 ) | 0 |
| | 4 | 1d | r4, mem ( r0 + r2 ) | 0 |
| | 24 | 1d | r9, mem ( r0 + r7 ) | 0 |
| | 5 | add | r5, r4, r3 | 2 |
| | 25 | add | r10, r9, r4 | 2 |
| | 2 | pne | p1, r1, 0 | 2 |
| | 2 | pne | p2, r8, 0 | 2 |
| | 6 | stp | mem ( b + r2 ), r5 ( p1 ) | 3 |
| | 26 | stp | mem ( b + r7 ), r10 ( p2 ) | 3 |
| | 8 | stp | mem ( b + r2 ), 0 ( /p1 ) | 3 |
| | 28 | stp | mem ( b + r7 ), 0 ( /p2 ) | 3 |
| | 9 | add | r2, r7, 4 | 3 |
| | 10 | bge | r7, r6, L100 | 3 |
| | 29 | add | r7, r2, 4 | 3 |
| | 10 | b1t | r2, r6, L1 | 4 |
| L100: | | | | |

REGISTER CONTENTS r0 = & b [ 1 ]
r1 = a [ i ]
r2 = i * 4
r3 = b [ i ]
r4 = b [ i + 1 ]
r5 = b [ i ] + b [ i + 1 ]
r6 = n * 4
r7 = ( i + 1 ) * 4
r8 = a [ i + 1 ]
r9 = b [ i + 2 ]
r10 = b [ i + 1 ] + b [ i + 2 ]

Fig.11

PROCESSOR WITH PIPELINING STRUCTURE AND METHOD FOR HIGH-SPEED CALCULATION WITH PIPELINING PROCESSORS

BACKGROUND OF THE INVENTION

Field of the Invention

The invention relates to a processor with a pipelining structure, in particular with a superscalar architecture, having a configurable logic unit, an instruction memory, a decoder unit and an interface device. The invention also relates to a method for high-speed calculation with pipelining processors.

Such microarchitectures are intended to achieve the maximum degree of parallelity at the instruction level in microcomputers.

Central arithmetic units in microcomputers mainly are formed of the processor, which should be regarded as an autonomous processor in the following text, for example as a microprocessor which is not part of a microprocessor system or for which that association is irrelevant for the purposes of instruction parallelity.

In general the processors are constructed on the basis of the von Neumann model. While that model has been dispensed with for separation of code and data storage area in the Harvard model (those storage areas are separated there and accessed by using different access routes), the strict processing and result sequencing of the command flow is applicable both in the von Neumann model and in the Harvard model with its many modifications and variants. Data flow computers, which operate with control by the data flow rather than by the control flow, represent exceptions to that model.

While retaining the sequential processing of the command flow, the introduction of so-called RISC architectures, which initially contained only a reduction in the instruction set to simplify the processor structure, has produced an increase in speed to one command per processor system clock cycle. That has been achieved by replacing a microprogram in the processor by hard-wired hardware and by extensive pipelining measures. Despite apparent parallelity within the processor, the maximum command rate, with one instruction per clock cycle, and the processing and result sequencing, have been maintained.

With regard to the prior art, U.S. Pat. No. 5,361,373 which describes a dynamically configurable gate array, as well as a publication entitled "High Performance Computing Using A Reconfigurable Accelerator" in "CONCURRENCY: Practice and Experience, Vol. 8 (6), 429 443 (July–August 1996)", should also be mentioned. The latter describes a pure coprocessor, which includes a reconfigurable arithmetic-logic unit (rALU) that is completely loaded at the start of the program (!) so that particular loops in a program can be processed quickly. That necessitates a high level of compiler complexity. Due to the complete capability to write to it, such an arithmetic unit has considerably more complex commands. Recompiling is tedious.

SUMMARY OF THE INVENTION

It is accordingly an object of the invention to provide a processor with a pipelining structure and a method for high-speed calculation with pipelining processors, which overcome the hereinafore-mentioned disadvantages of the heretofore-known devices and methods of this general type and which achieve increased parallelity during processing, through which the microcomputer can increase its processing speed.

The very latest developments in the last two years in the field of processors achieve a processing speed, on average, of more than one instruction per clock cycle. Those processors, which are called "superscalar" and are referred to as having both RISC and CISC (Complex Instruction Set Computer) architecture offer a speed level which no longer allows a sequential processing sequence. Comprehensive measures in the internal structure of the processors have made it possible to process a number of instructions and the actions linked to them in parallel with one another, with the results as well as the interruption capability being ensured for the purposes of sequential processing.

One example which may be mentioned of such a microarchitecture of a superscalar processor is the publication "Proceedings of the IEEE", Volume 83, No. 12, page 1609, by James E. Smith, entitled "The Microarchitecture of Superscalar Processors". That publication offers an overview of the tasks of superscalar processors.

A paper which follows immediately on page 1625 in the same volume of the same journal, entitled "Compiler Technology for Future Microprocessors", by Wen-Mei W. Hwu et al, describes the associated compiler technologies.

However, a common feature of all new developments is that the result protection, which is equivalent to compliance with the result sequencing, includes the identification and correction of actual and virtual faults, so-called hazards, which occur as a result of processing parallelity at the instruction level. The only real hazard in that case occurs in "Read After Write" (RAW) since it is not possible to read a value as an output basis for a calculation until after a preceding writing operation. Such a sequence cannot be processed in parallel form, since the virtual hazards of "Write After Read" and "Write After Write" can be corrected by so-called "Register Renaming".

Superscalar processors can make the best possible use of their theoretical performance with the aid of specially constructed assembler programs as well as an appropriate compiler technology, which provides programs optimized in that way.

With the foregoing and other objects in view there is provided, in accordance with the invention, a processor with a pipelining structure, in particular with superscalar architecture, comprising an instruction memory; a decoder unit connected to the instruction memory; an interface device for storing data; and a multiplex-controlled s-paradigm unit having a programmable hardware structure for dynamic reconfiguration/programming during program running, the s-paradigm unit including a programmable structure buffer connected to the decoder unit and acting as a configurable logic unit; an integer/address instruction buffer connected to the decoder unit; an integer register file connected to the instruction buffer and connected to the interface device for direct communication; a functional unit with programmable structures; and a multiplicity of data links connected by multiplexers, for linking contents of the integer register file to the functional unit; the functional unit including a plurality of arithmetic units for arithmetic and/or logical linking of two operands on two input buses to produce a result on an output bus; a plurality of compare units having two input buses and one output bit; a plurality of multiplexers having a plurality of input buses and one or two output buses, the multiplexers connected between the arithmetic units, the compare units and the register file; and a plurality of demultiplexers having one input bit and a plurality of output bits, for delivery of a comparison result in a destination selection to corresponding arithmetic units within the s-paradigm unit.

The above task, of increasing the maximum command rates, is achieved by a microprocessor having these features.

In accordance with another feature of the invention, the integer register file is a floating point register file having appropriate links or a floating point register file having appropriate links is provided in addition to the integer register file.

In accordance with a further feature of the invention, the arithmetic units and compare units have a configurable and dynamically programmable functionality during program running for one block of commands in each case. With the objects of the invention in view, there is also provided a method for high-speed calculation with pipelining, which comprises forming the largest possible block in the s-paradigm unit in the course of assembler coding and introducing conditioned commands executed or jumped over on the basis of "decision" bits; then buffer-storing configuration bits for subunits in a programmable structure buffer and loading the configuration bits into the s-paradigm unit during processing of the block; and defining the decision bits for governing a control flow by comparisons, for producing an optimum data flow translation in conjunction with comparators, in dynamic multiplexers as a sub-type of the arithmetic units.

Other features which are considered as characteristic for the invention are set forth in the appended claims.

Although the invention is illustrated and described herein as embodied in a processor with a pipelining structure and a method for high-speed calculation with pipelining processors, it is nevertheless not intended to be limited to the details shown, since various modifications and structural changes may be made therein without departing from the spirit of the invention and within the scope and range of equivalents of the claims. The construction and method of operation of the invention, however, together with additional objects and advantages thereof will be best understood from the following description of specific embodiments when read in connection with the accompanying drawings.

The following text describes, in particular, a microprocessor in which the efforts toward superscalar architecture have been continued and have been improved by the introduction of a programmable structure, which is also called structural programming, in such a way that use of the technology available now results in a considerably higher processing speed. In this context, the architecture will be explained first, the assembler and compiler measures resulting from this will then be described and, finally, a number of calculation examples will be used to show the improvement in speed resulting from the intensive mutual parallelity of the instruction.

Another advantage is that read after write hazards can be corrected in a suitable manner. Read after write actually has the meaning that access must be made to a result after calculation in order to continue the remaining calculation flow. However, in the case of the s-paradigm unit described in the following text, this result is present before it is stored, and it is possible to continue using it, with the correct value, within the structure at this stage. This is equivalent to gaining one execution clock cycle, which had to be used for storage in the previous variant. with the novel structural measures in the foreground, one also speaks of an s-paradigm computer or an s-paradigm model on the basis of which the microprocessor operates.

Description of the s-paradigm model

In principle, the s-paradigm model can be employed to the executing unit within any processor since this is the only unit which differs from the von-Neumann model, and the control flow-based sequence of obtaining commands, which is actually a typical feature of the von-Neumann model, is not affected thereby. However, in order to illustrate the performance of the model, the s-paradigm model will be presented in the following text in conjunction with, and comparison with, a superscalar processor of a conventional type, without any limitation to generality.

DESCRIPTION OF THE PREFERRED EMBODIMENTS

Figure 1:
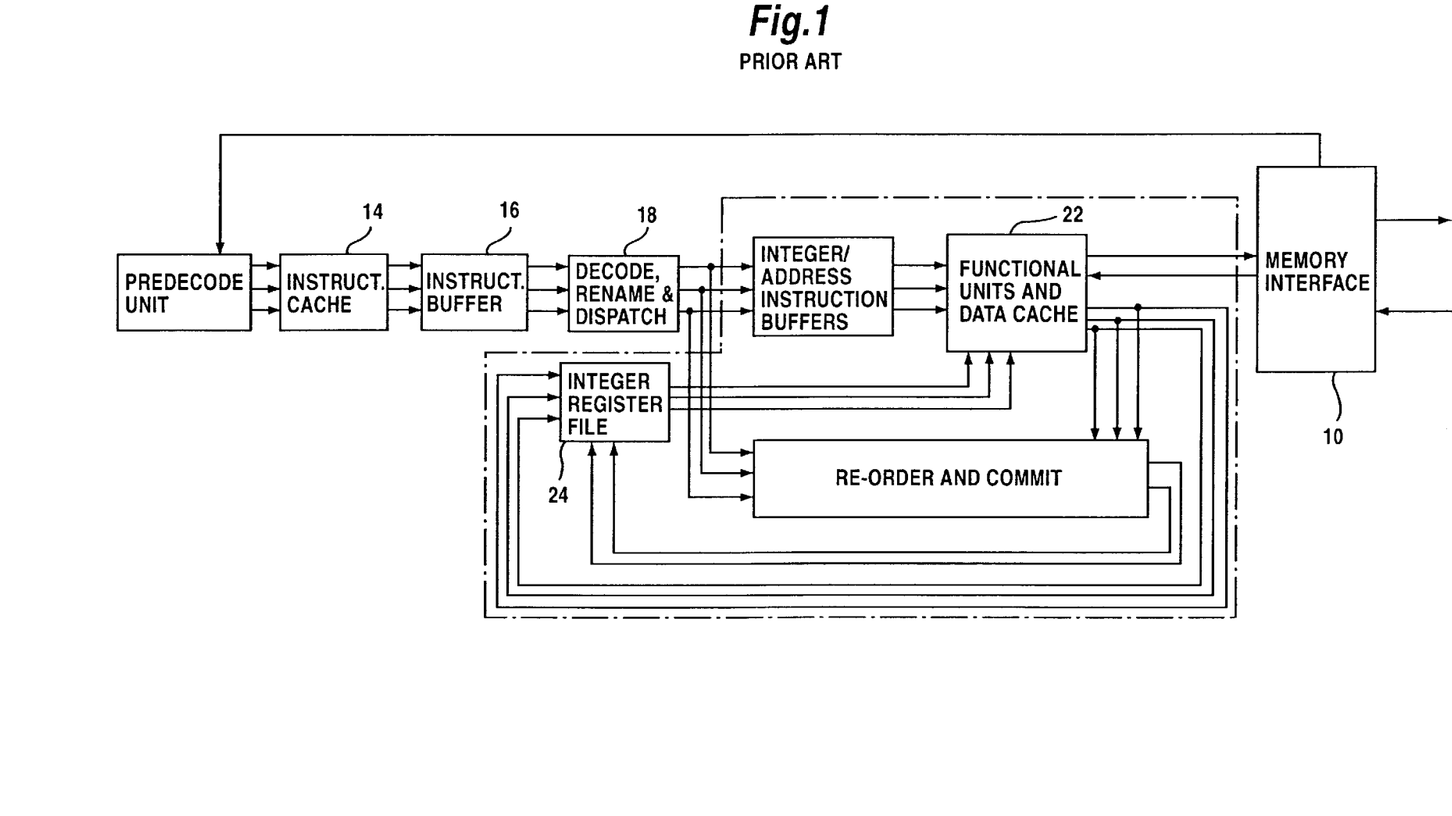
FIG. 1 is a block diagram showing a typical organization of a conventional superscalar processor.

Referring now to the figures of the drawings in detail and first, particularly, to FIG. 1 thereof, there is seen a structure of a superscalar processor with a floating point unit deliberately omitted. The characteristics described in the following text regarding the executing unit for the integer part of the computer can be transferred 1:1 to the floating point unit.

Within the processor, an integer register file, functional units and a reorder and commit unit are replaced by a new unit, an s-unit. This unit will be explained in more detail in the following text. In addition, changes are required to a number of other units, and these will likewise be described in the following text. However, a brief explanation of the functionalities in FIG. 1 will be given first.

A memory interface 10 produces a connection to an external code and data storage area (non-illustrated main memory L-2-cache, etc.). Instructions are stored in an instruction cache 14, with predecoding. The predecoding is advantageous if additional information is intended to be produced for faster processing for subsequent stages, but can otherwise be omitted. The instructions are then stored in the instruction cache 14 as direct memory before processing and/or in an instruction buffer 16, and in the latter case they are processed at that stage. FIG. 1 thus corresponds to the prior art.

A decode, rename & dispatch unit 18 which follows the instruction buffer 16 distributes the commands within a superscalar architecture to a number of executing subunits in a functional unit 22 and assigns registers from an integer register file 24. That assignment must be carried out on the basis of register renaming, in order to avoid virtual hazards. The functional units 22 may interact closely with a data cache in order to allow the necessary operands to be loaded. After parallel execution of a number of instructions, the results in the registers are reordered or, in particular, are designated as valid (in the reorder and commit unit).

The final item which should be mentioned in conjunction with the model is that conditional and non-conditional branches are handled outside the section being presented herein. Measures such as branch prediction are envisaged in that case, with execution on the basis of samples, which lead to delays if not satisfied.

Figure 2:
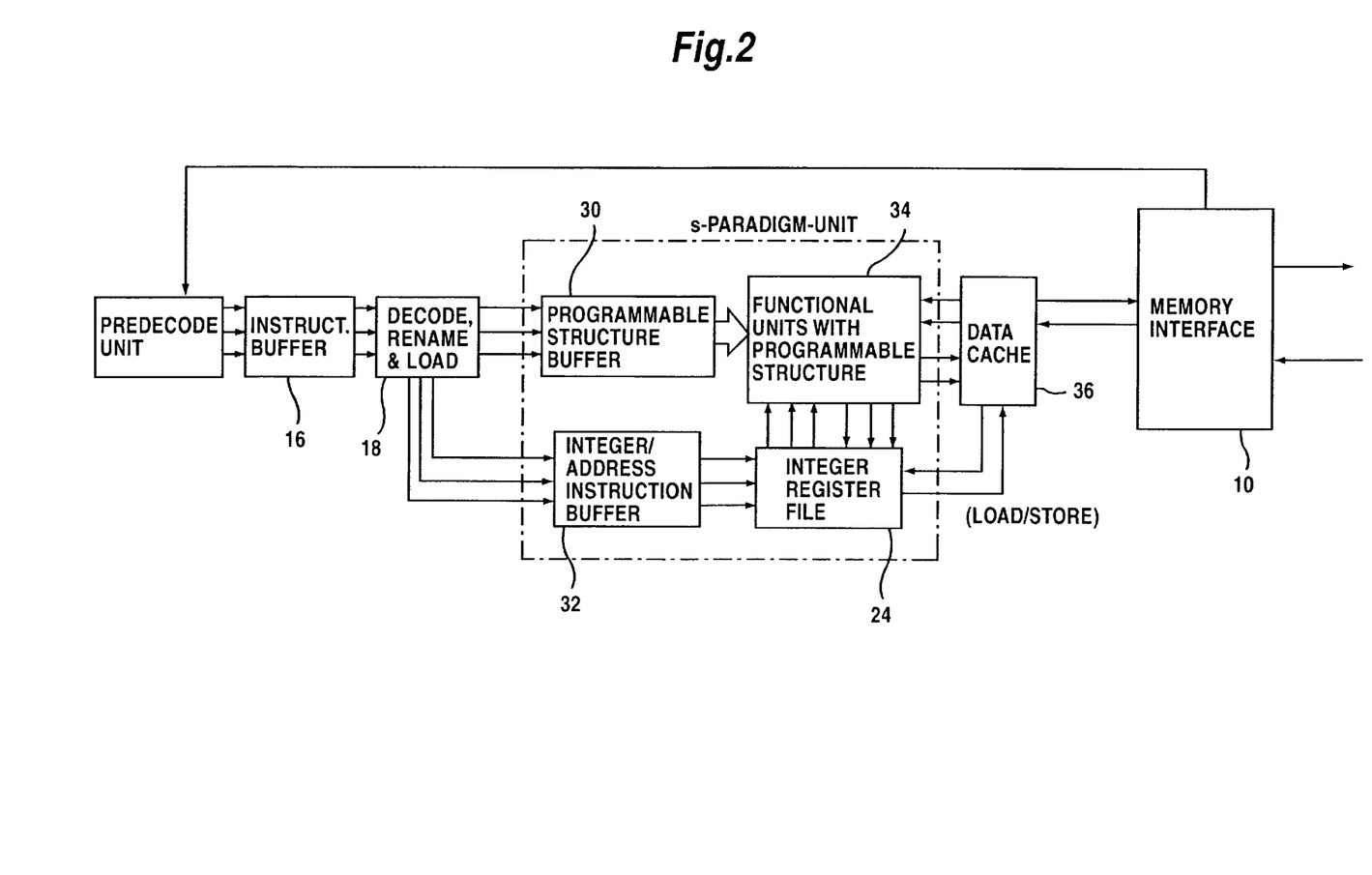
FIG. 2 is a block diagram showing a microarchitecture according to the invention.

The blocks which are on a gray background in FIG. 1 and are provided in that way in the prior art are constructed in a correspondingly different manner according to the invention, as is illustrated in FIG. 2.

As is shown in FIG. 2, a programmable structure buffer 30, an integer/address instruction buffer 32 and a unit 34 having functional units with a programmable structure, are provided in addition to the integer register file 24.

In this case, the s-paradigm model recognizes four classes of machine commands:
 branch and jump commands for control flow control,
 load/store commands for data transfer between registers and storage area,
 arithmetic and logic commands for calculation, and
 other commands such as no operation, wait, stop etc., which are also used, in the widest sense, for control flow control.

While the command classes for control flow control are left unchanged and are thus executed in accordance with the standard in superscalar computers, the load/store commands and the arithmetic/logic commands assume a new position. Load/store commands are either used with the aid of one or more load/store pipeline(s) for data transfer between the integer register file 24 and the data store (cache 36, main memory) and then once again processed as in the past, or they are added to the arithmetic/logic commands and integrated into the core (which will now be described) of the s-paradigm model. The decision on this is made by the system designer of the CPU. On the other hand, move commands, which cause a data transfer between the processor registers, are also part of this model.

The arithmetic/logic commands (and the load/store commands in addition to them) are translated, on the basis of their programming sequence, into a structure of successive hardware links. To this end, the functional unit in the microcomputer according to the invention offers a programmable structure and hard-wired arithmetic/logic links (possibly as well as access functions such as load/store pipelines), which can be linked to one another by the structure and are processed in the structuring sequence.

Figure 3:
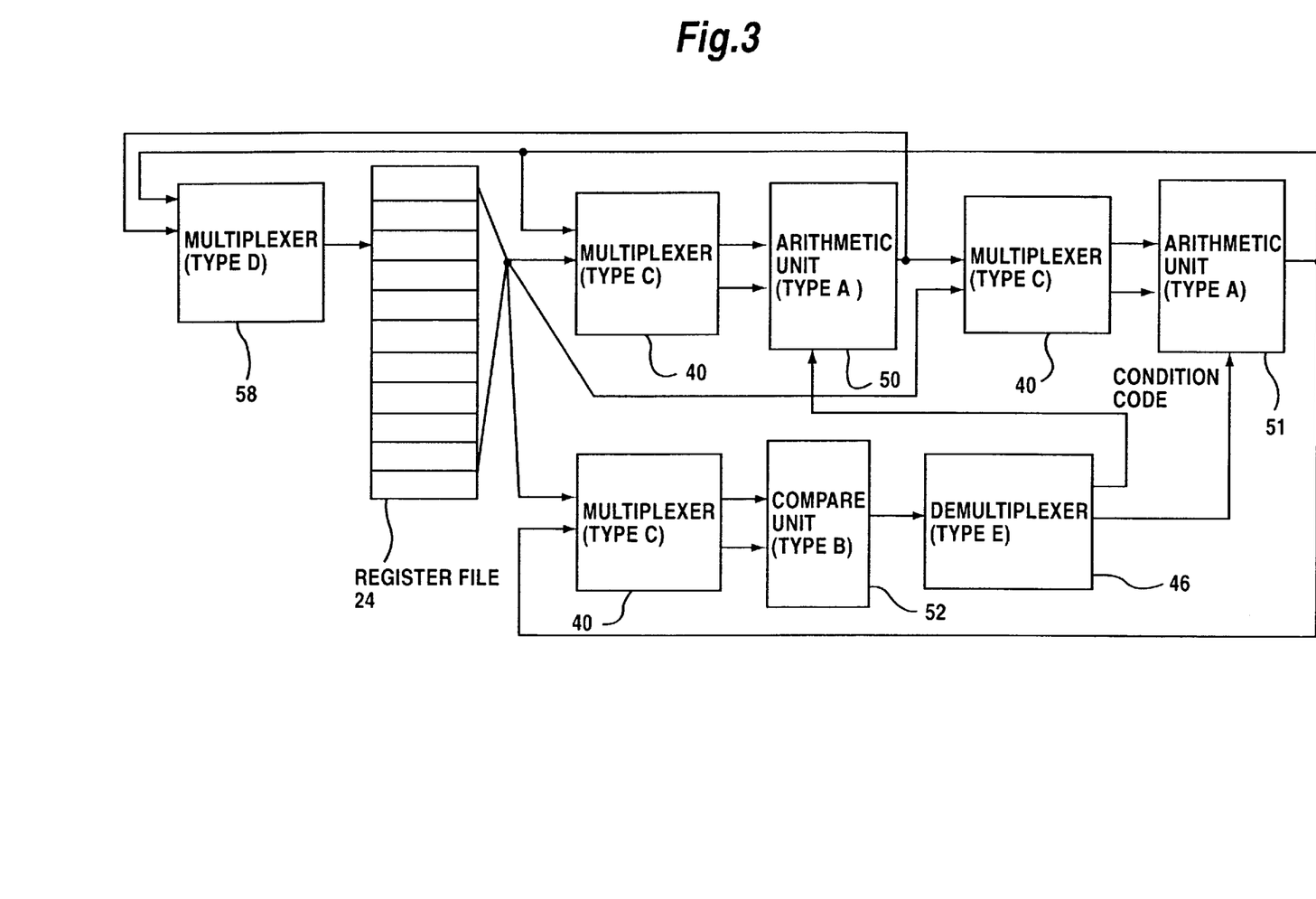
FIG. 3 is a block diagram showing a basic structure of a functional unit.

The corresponding functionality is explained with regard to FIG. 3. There, the subunits of the functional unit 22 and the register file 24 (on a gray background in FIG. 3) are connected by a multiplicity of data links and multiplexers 40. The data links in this case are constructed as buses with a respective internal data bus width (for example 32 bits), with one exception being condition codes, which are implemented as bit lines (shown dotted). Within the functional unit, there are five types of subunits:
 Arithmetic units (AU, Type A) 50 and 51, which should not be confused with the conventional arithmetical logical unit (ALU). The AU 50, 51 contains one or a small number of links, which are then configurable, for example the capability to add two integer numbers. It provides a result at its output when the inputs are appropriately connected and this result can be used further within the switching network. The AU 50, 51 is indicated as having two input buses and one output bus, possibly a configuration capability (selection of the link, in the extreme case corresponding to an ALU) and conditional bits. In a number of cases, for example in the case of multiplication, the width of the output bus may differ, in order to facilitate the calculations.

A compare unit (CoU, Type B) 52, which is likewise connected downstream of a multiplexer. In order to provide conditional execution of the link, condition code bits are produced in this case by a configurable comparison in the CoU 52. The comparison can be adjusted by using three configuration bits to >,>=,<, <=,!=,==, TRUE or FALSE. The CoU is indicated as having two input buses and one output bit, as well as the configuration capability.

Multiplexers (MulC, Type C) 40 load the inputs of the AUs and of the CoUs with two input values of the full processing width in each case. In order to do this, they require a number of configuration bits, which are obtained from the number of inputs and the two outputs. MulC units are indicated as having two output buses.

Furthermore, multiplexers (MulD, Type D) 58 which should be mentioned, are provided upstream of the register file 24. Only one output bus, and thus only half the configuration bits as well, are required to load the register with the result values. The difference between a MulD and the MulC is the number of output lines that it has.

Finally, demultiplexers (Demul, Type E) 46 which should also be mentioned, pass on the results of the comparisons (CoU) to corresponding AUs. In contrast to the multiplexers 58, which carry out source selection, destination selection is carried out in this case.

The links between the subunits may be constructed to be complete or partial, depending on the number of available configuration bits overall. An example of the architecture in the next section shows a complete linking capability, and the number of necessary bits is calculated therefrom.

The purpose of the structurable functional unit according to the invention is now to match the structure in an appropriate manner to the machine commands in a (basic or super) block in a program. A quality of such blocks is the fact that they manage without any branch commands (basic block) or with branch commands that are only rarely used (super block), that is to say can be defined in the control flow deterministically or at least with high probability. The problems regarding these blocks and their effects on assembler and compiler technology will be discussed in more detail in the section after the next which is entitled "Consequences of the S-Paradigm Model For Machine Commands, Assembler Programming and Compiler Structure".

Programming in the s-paradigm model is carried out by loading configuration bits for the subunits. These are buffer-stored in the programmable structure buffer and, while the block is being processed, are loaded into the s-unit S which, in consequence, is appropriately structured and can process the block. The processing in this case relates only to the arithmetic and logic links between register contents and possibly to memory contents (if an appropriate load/store pipeline is available), while all of the other commands, in particular load/store and control flow commands, are executed as normal.

The configuration bits may be generated in the assembler (compile time based generation) but, in principle, it is also possible to allow them to be produced in the CPU, for example by a functionally expanded programmable structure buffer, on the basis of the runtime (runtime-based generation).

Embodiments of the Execute Unit of the Microcomputer According to the Invention The structure of the s-unit S with hard-wired AUs 50, 51 as well as CoUs 52 and configurable paths between these subunits first of all ensures that the multiplexer represents the programmable element in this configuration. The hard wiring, particularly of the AUs 50, 51, was chosen to keep the number of bits to be loaded as low as possible. In a further flexibility improvement stage, the AUs 50, 51 could also be programmable, that is to say implemented as an extension to simple structures such as NAND gates or disjunctive normal forms (DNF). This would allow virtually any functionality to be integrated in one AU 50, 51.

The arithmetic units 50, 51 contain, for example, the following functionalities:

- arithmetic links such as addition, subtraction, multiplication and division,
- logic links such as AND, OR, XOR, NOT, complement (two's-),
- shift functions such as arithmetic or logic shifts to the right/left, and
- conditional data transfers, depending on input bits (2-way multiplexer, in contrast to the MulC and MulD subunits switchable to runtime).

Figure 4:
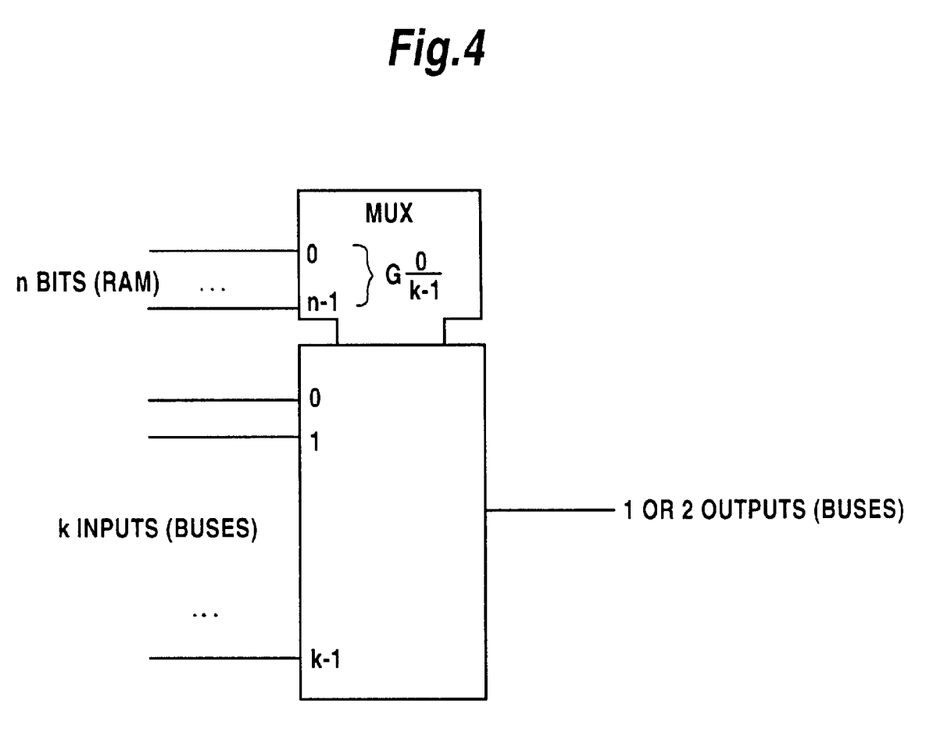
FIG. 4 is a diagram showing a structure of a multiplexer.

The program of the structure, that is to say of the two multiplexer types, is based on RAM cells. This ensures very fast configuration, while other technologies such as EEPROM would require more time and would thus be feasible for the use of programmable AUs instead. $2^n$ paths can then be switched using n bits, so that 2×5 bits would be necessary for configuration of an MulC with 32 inputs, and 5 bits for an MulD. The basic structure of these multiplexers is shown in FIG. 4.

The following subunits and registers are now implemented in one possible specific model architecture:

- four adders (AU) in which the addition is carried out by a condition code bit (TRUE) or the first word is passed through unchanged (FALSE),
- a logic unit with AND, OR, XOR and two's-complement formation, configurable by 2 bits (AU),
- a multiplier (AU),
- a divider (AU),
- a shift functional unit (AU) which is configured by using two bits for shift to the left/right and arithmetic/logic,
- two dynamic path multiplexers, which can connect one of the two input buses to the output through the use of a bit in the control input (AU). These multiplexers should not be confused with the Type C or D multiplexers, since the subunit proposed herein switches the selection dynamically,
- six comparison units, each having one bit output configurable through three bits to eight comparison types (CoU) 52,
- twelve logic registers R0 to R11 which are identified by register renaming and a pool of, for example, 24 physical registers, and
- four constant registers C0 to C3, in which the constants that are coded in the instruction code are stored while a block is being processed.

This results in a total of 32 parts to be linked within the s-unit S. If a complete linking capability is required, the multiplexers must essentially be configured with five or 2×5 bits. Ten Type C multiplexers, twelve Type D multiplexers and six Type E multiplexers are required to link all of the units. Since it is assumed that the conditioning through the use of comparison operations relates only to AUs, the demultiplexers require only three bits for configuration. The meaning of this is that the total number of configuration bits (for multiplexers and configurable AUs) is 200 bits.

The model can also be expanded to handle flags, which is possible through the use of separate AUs with evaluation characteristics. In order to prevent and/or detect any overflowing during arithmetic operations, data buses and corresponding evaluation units of sufficient size are necessary, but they have been omitted for reasons of clarity.

Consequences of the S-Paradigm Model for Machine Commands, Assembler Programming and Compiler Structure The microcomputer according to the invention operates in a very similar manner to the superscalar architectures which are based on the parallel instancing of ALUs. An important feature for optimum utilization of this architecture is that the blocks formed in the course of assembler coding are as large as possible.

In this context, a basic block refers to a sequence of instructions which do not include any branches, for example resulting from a conditional branch command. Such basic blocks in conventional compiler technologies are, more likely, relatively short, so that the utilization of the internal parallelity remains low. At the moment, a number of compiler strategies are being developed, as indicated by the Smith publication mentioned above, which promise improved utilization. One methodology is the generation of superblocks which are passed through in the normal course of a loop, and are likewise regarded as suitable blocks in the context of that work. The introduction of conditioned commands which are executed or jumped over on the basis of a decision bit is of considerably more interest. This decision bit can be produced by comparisons and then governs the control flow, that is to say, and even in limit conditions acts to replace the branch.

Figure 5A:
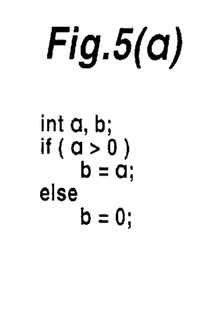
FIG. 5 is a chart showing a comparison of two codes.
Figure 5B:
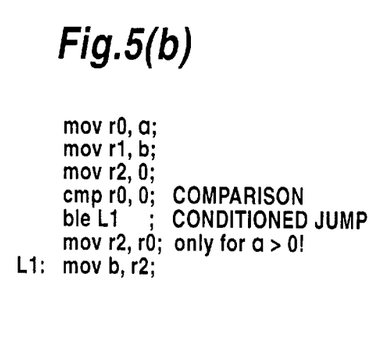
Figure 5C:
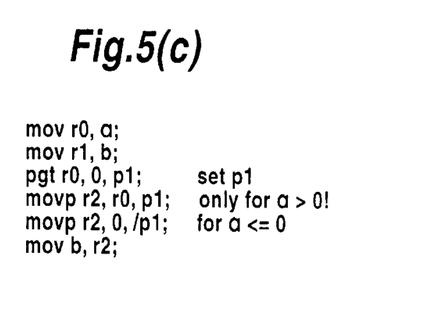

One example of the use of such conditioned command configurations, the "predicated execution", may be provided by the sequence in C and assembler (see Annex A for the command meanings) illustrated in FIG. 5.

This example is shown for a pseudo-CPU, which translates a conditional value assignment in a conventional manner with relatively optimum utilization of registers. However, the jump command ble (branch if less or equal) which occurs in this case refers to a possible branch in the control flow, that is unnecessary in the implementation and utilization of conditional command execution. In this case, a bit is set in a register p1 if r0>0, otherwise it is deleted and conditional movp commands relate to p1 and are mutually exclusive, so that this can be implemented well in co-running hardware in which only one path may be active.

The brief example should not in any way be regarded in this case as evidence of acceleration of conditioned commands. However, relatively detailed works such as that by Smith (mentioned above) have shown that these machine commands have an extraordinarily advantageous effect on the flow within an execute unit of superscalar microprocessors.

Figure 6:
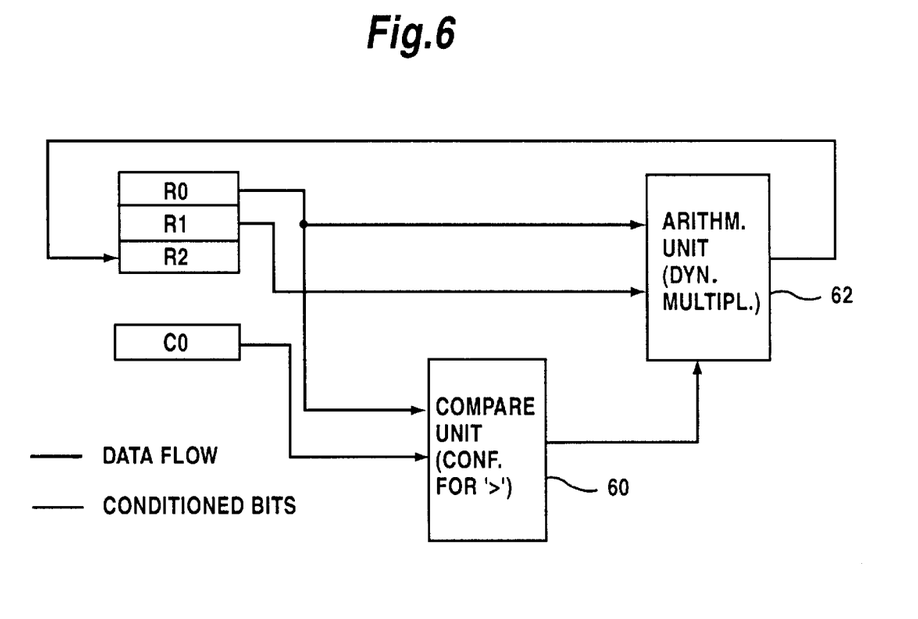
FIG. 6 is a diagram showing a data flow translation for assembler code.

Hardware implementation can be carried out by the dynamic multiplexers in conjunction with the comparators, as is illustrated in FIG. 6 on the basis of the data flow translation for assembler code.

The translation is carried out by assignment of a comparator 60, which is conditioned for "greater than", and of a dynamic multiplexer 62 which carries out the selection from the two incoming data streams on the basis of the comparison result, to form this execution block. The load/store commands remain in the previous form and are not illustrated. In addition, a register C0 (for constants) must be loaded with the comparison value, in this case "0".

The following commands are now assumed in addition for the machine command set of the microcomputer according to the invention:

PEQ <Dest>, <Source>, <Destination bit>(equality)
PNE <Dest>, <Source>, <Destination bit>(inequality)
PGE <Dest>, <Source>, <Destination bit>(greater or equal)
PGT <Dest>, <Source>, <Destination bit>(greater than)
PLE <Dest>, <Source>, <Destination bit>(less or equal)
PLT <Dest>, <Source>, <Destination bit>(less than)

It is, of course, feasible to extend this command set in order to set condition bits. It would then be necessary to have the capability to evaluate these condition bits, and this can be carried out by the introduction of conditional shift and arithmetic/logic commands. The model architecture of the microcomputer according to the invention is thus predicated, in the following text, on the capability to apply a condition to all shift commands (movp) and on the arithmetic/logic commands being executed in such a way that the first link operand is passed through if the condition is not satisfied. Thus, in the case of the addp <Destination>, <Operand_1>, <Operand_2>, <Prediction-bit>

The link <Operand_1>is loaded into the destination register if the <Prediction_bit>is deleted, otherwise the sum of <Operand_1>and <Operand_2>.

The other methods for improving the throughput in the microcomputer according to the invention correspond to those for superscalar microprocessors. If the programming is carried out in assembler or C (as an example of a high-level language), these include:

use of the conditional execution of commands to create larger blocks without control flow structures,
unrolling loops to the resource maximum, and
dependency analysis and avoiding dependencies by (compile time) register renaming.

Once this has been carried out to an optimum extent for a superscalar architecture, the existing blocks are analyzed once again and are translated in the structural programming. This translation can be carried out at the compile time, with the advantage being intensive analysis without using silicon in the target system. The structural programming in this case is considerably assisted by the existing dependency analysis and, above all, by avoidance, so that the commands can be converted into data flows and thus into the structure. This structure now has no cycles or feedback paths, which will be unusable for hardware structuring with an asynchronous structure.

The performance improvement results from the utilization of two advantages in comparison with a "classical" architecture of a superscalar microprocessor. The ALU, of which there are a number in the previous architecture, is now split, so that the individual parts can be used independently of one another. On the assumption that the runtime within the programmable structure remains so short that the results are obtained within one clock cycle irrespective of the data flow path, this results, on average, in better utilization and shorter execution times.

However, the control and/or determination of the execution time within the s-unit is a major item in the hardware implementation. The following methods are available in this context:

The structural program capability is constructed and matched to the maximum permissible clock rate in such a way that the runtime within the s-unit for each case is dimensioned so that the result can be stored in the registers after one clock cycle.

The hardware, having elements which are linked to one another asynchronously in each case (synchronization is not carried out in any case until the registers, which is the reason why it is also necessary to avoid dependencies), also provides, during the run, a ready signal which controls the transfer to the registers. This form may allow higher clock rates, with one clock cycle normally being required, for example, for the run, and exceptionally two clock cycles.

In the following text, it is intended to analyze an exemplary program, translate it, and optimize it for a superscalar architecture. The running speeds of this machine program will then be compared with the microcomputer according to the invention. This example originates from the publication by J. Smith, mentioned above, to ensure that the results can be produced in a suitably comparable form.

Exemplary program

The interaction of compiler technology and capabilities for paralleling by the structural programming of the hardware can be demonstrated by using a simple C loop. In this case, on one hand the code generation is based on a superscalar microprocessor which has at least 12 registers, conditional instructions and two co-running ALUs, both equipped with all of the capabilities, and on the other hand the model of an s-unit proposed above is used. The following steps are carried out during this process:

1. The C source code is translated using a compiler which is optimized for non-superscalar architectures.
2. The block size is increased by replacing the conditional jumps by conditional instructions.
3. Two loops are combined in each case to form a larger loop (loop unrolling).
4. (Compile time) register renaming is carried out for the loop that is obtained, using a dependency analysis.

The level of paralleling and the number of clock cycles required are stated for all of the stages in the optimization and, for the highest level, in the form of a comparison between a superscalar architecture of the previous type and a microcomputer according to the invention.

Figure 7:
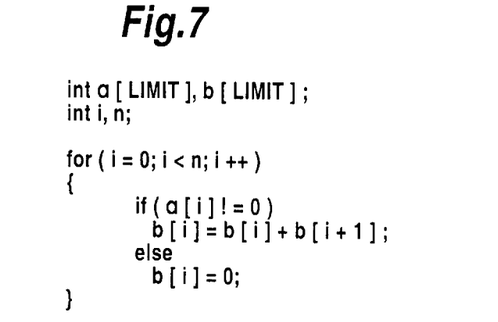
FIG. 7 is a chart showing a C source code.

FIG. 7 illustrates the C source code. The program includes an assignment loop to an array b[ ] as a function of an array a[ ], wherein it is necessary to analyze in particular the read after write dependencies in this case.

The interesting feature of this code is the sequence of addresses which are respectively accessed, since the assignment is b[i]+b[i+1] in one part of the loop, and the second element for the 1st access is thus the same as the first element for the second loop. The translation of the C source code using an optimizing compiler constructed for traditional architectures now results in an assembler listing shown in FIG. 8.

Figure 8:
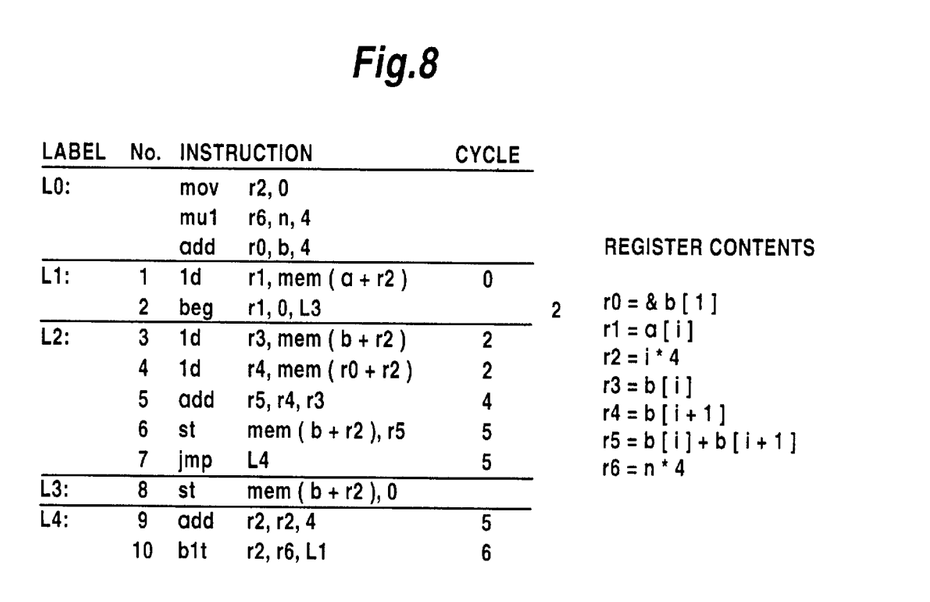
FIG. 8 is a chart showing a first optimization of the assembler code.
Figure 9:
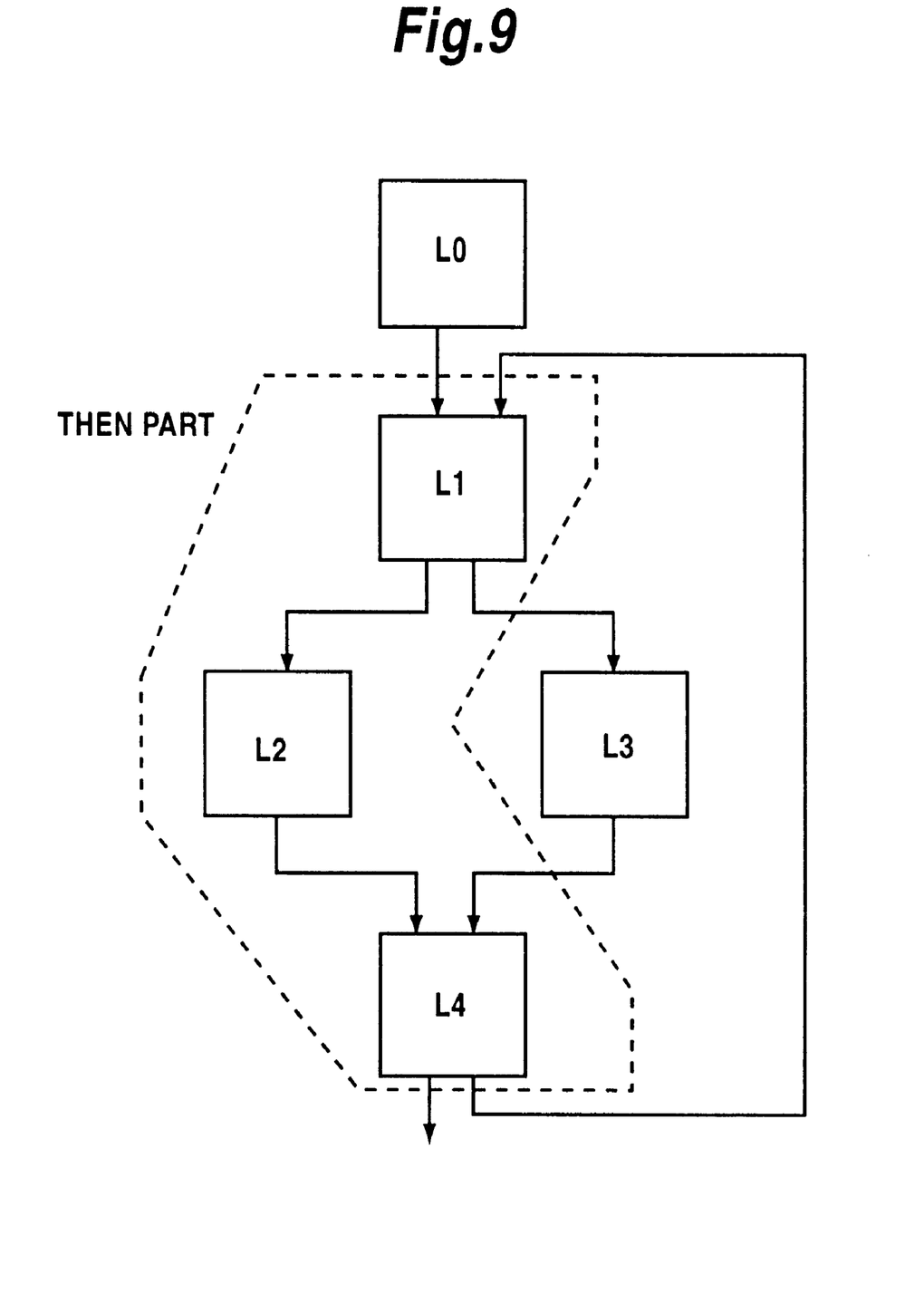
FIG. 9 is a control graph for assembly.

A control flow chart, as is illustrated in FIG. 9, shows the paths over which this code travels. The compiler itself has optimized the assembler code in such a way that a number of basic blocks are produced (separated by lines in FIG. 8).

Successive instructions 1 and 2 mean, for example, that there is a read after write hazard in this case: r1 is written first and is not read until after this for comparison with 0. The meaning of the dependency is that parallel execution is not possible. The column for the current cycle relates to a superscalar architecture which, in principle, can carry out the actions in parallel. The calculation of a loop lasts for a maximum of 6 cycles (assuming 2 cycles for a data transfer to the main memory), so that 1.5 instructions/cycle are executed for the instructions passing through the "then" part at 9.

Figure 10:
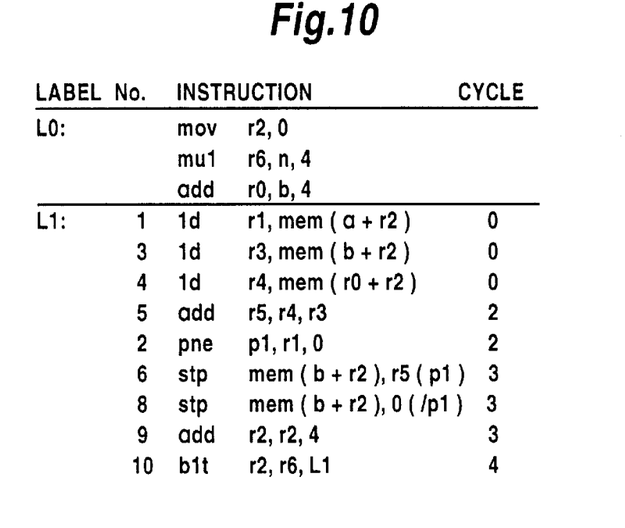
FIG. 10 is a chart showing a second optimization of the assembler code.

A 1:1 copy of a block L4 for the "else" part, a change in the sequence of instructions and replacement of the conditional branch by the conditional execution of the store commands, allows the basic block size to be increased. An associated assembler listing in FIG. 10 shows an acceleration of a loop to 4 cycles (on the assumption that the last branch is predicted correctly).

These measures increase the throughput per loop for a superscalar architecture to 2 instructions/clock cycle. If it is now assumed that the s-paradigm unit S can process any given switching network in one clock cycle, then, in contrast, the implementation in the microcomputer according to the invention requires one clock cycle for all of the calculations including the conditional value assignment, and that the time per loop be shortened to 3 clock cycles, with the throughput being 2.66 instructions/clock cycle.

Figure 11:
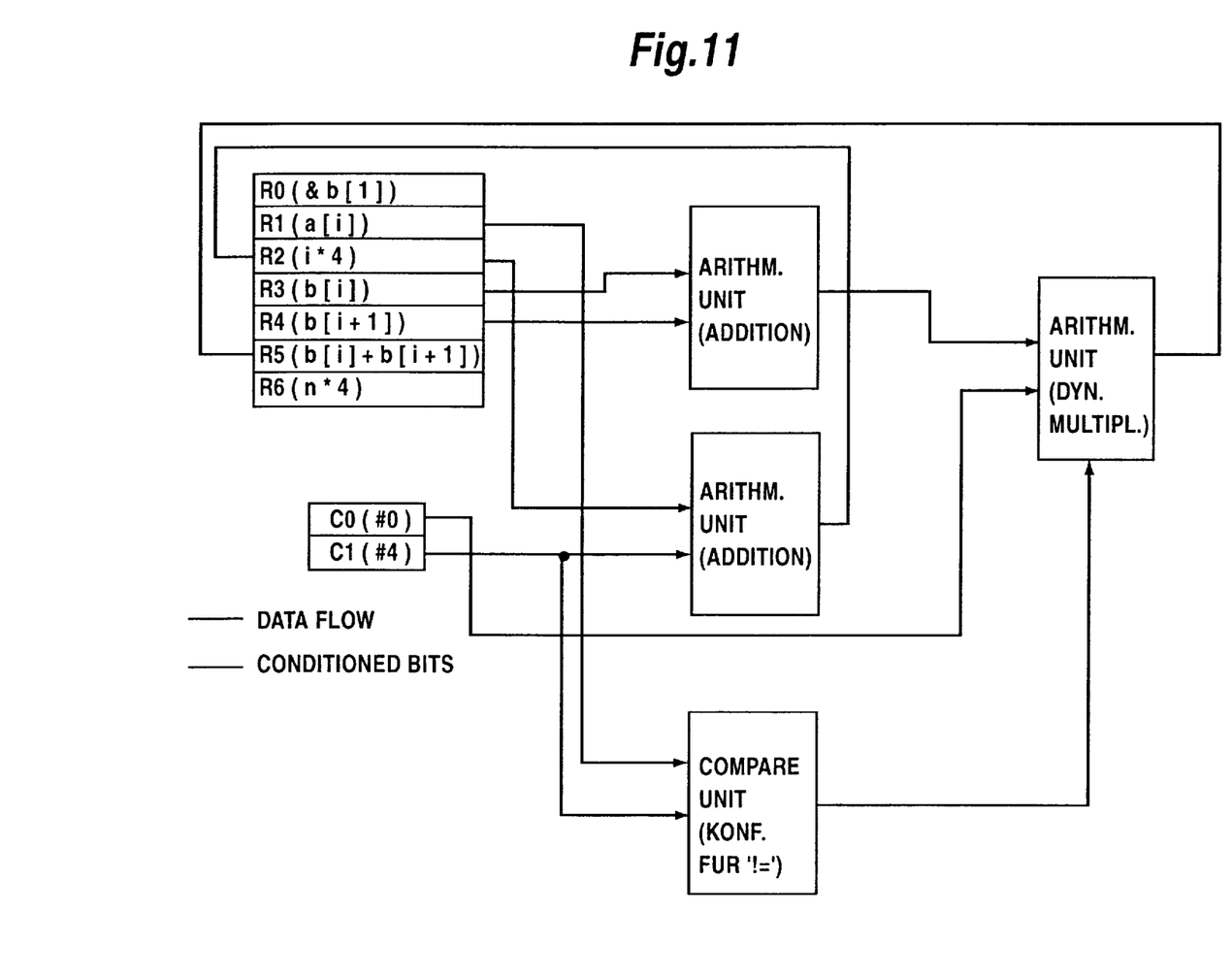
FIG. 11 is a diagram showing a data flow translation for the assembler code in FIG. 10.

FIG. 11 shows the structure of an s-unit S. The load/store commands, which are used for communication with the external memory, likewise have to carry out arithmetic calculation for the effective address. These are not shown herein although, in principle, adders from the s-unit could also be used for the address addition.

The last stage of the optimization processes shown herein is improving the performance by combining two loop runs into one (loop unrolling), with subsequent dependency analysis and avoidance. This optimization increases the throughput provided independent, parallel processing of both loop sections is possible. This method therefore uses compile time register renaming to avoid dependencies.

Figure 12:
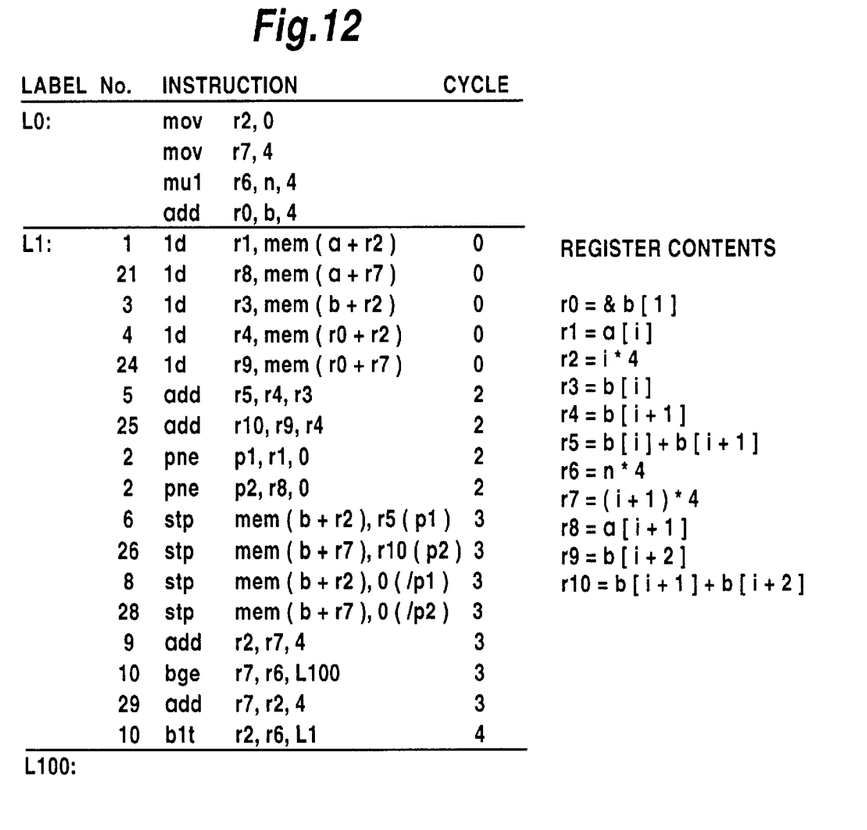
FIG. 12 is a chart showing a third optimization of the assembler code.

FIG. 12 illustrates the result after the optimization [1].

The parallel processing of two loops reduces the processing time to an average of 2 clock cycles per (former) single loop, with 3.75 instructions/clock cycle now being used as the paralleling measure. This applies to the superscalar architecture, while the microcomputer according to the invention in the specific model of the section (described above under the heading "Embodiment of the Execute Unit of the Microcomputer According to the Invention") provides a further improvement.

Apart from the address calculations, four additions in a double loop as well as two conditional assignments are required. These resources are provided in the model which, for its part, was equipped with additional capacities specifically to execute loops. In consequence, the entire block of additions and value assignments can be carried out in one clock cycle, once again assuming that it is possible to pass through the switching network in a stable manner during the clock cycle. The average processing time per single loop is then about 3 clock cycles, giving a rate of 5 instructions/clock cycle.

Thus, in the final analysis, structural programming has been introduced for the first time into the central processing element for procedural programs, the CPU. Subject to limitation to a reconstruction of the executing unit, a specific model has been constructed with limited resources, with it being shown that this model offers considerably improved performance in comparison with previous superscalar architectures. The processing times have been shortened by 25 to 33% in the examples.

I claim:

1. A processor with a pipelining structure, comprising:

an instruction memory;

a decoder unit connected to said instruction memory;

an interface device for storing data; and a multiplex-controlled s-paradigm unit connected to said interface device and having a programmable hardware structure for dynamic reconfiguration or programming during program running, said s-paradigm unit including:

a programmable structure buffer connected to said decoder unit and acting as a configurable logic unit;

an integer or address instruction buffer connected to said decoder unit;

an integer register file connected to said instruction buffer and connected to said interface device for direct communication;

a functional unit with programmable structures; and a multiplicity of data links connected by multiplexers, for linking contents of said integer register file to said functional unit;

said functional unit including:

a plurality of arithmetic units for at least one of arithmetic and logical linking of two operands on two input buses to produce a result on an output bus;

a plurality of compare units having two input buses and one output bit;

a plurality of multiplexers having a plurality of input buses and from one to two output buses, said multiplexers connected between said arithmetic units, said compare units and said register file; and a plurality of demultiplexers having one input bit and a plurality of output bits, for delivery of a comparison result in a destination selection to corresponding arithmetic units within said s-paradigm unit.

2. The processor according to claim 1, including a superscalar architecture.

3. The processor according to claim 1, wherein said integer register file is a floating point register file having appropriate links.

4. The processor according to claim 1, including a floating point register file having appropriate links in addition to said integer register file.

5. The processor according to claim 1, wherein said arithmetic units and compare units have a configurable and dynamically programmable functionality during program running for one block of commands in each case.

6. A method for high-speed calculation with pipelining, which comprises:

providing an instruction memory;

connecting a decoder unit to the instruction memory;

providing an interface device for storing data;

providing a multiplex-controlled s-paradigm unit connected to the interface device with a programmable hardware structure for dynamic reconfiguration or programming during program running;

providing the s-paradigm unit with a programmable structure buffer connected to the decoder unit and acting as a configurable logic unit; an integer or address instruction buffer connected to the decoder unit; an integer register file connected to the instruction buffer and connected to the interface device for direct communication; a functional unit with programmable structures; and a multiplicity of data links connected by multiplexers, for linking contents of the integer register file to the functional unit;

providing the functional unit with a plurality of arithmetic units for at least one of arithmetic and logical linking of two operands on two input buses to produce a result on an output bus; a plurality of compare units having two input buses and one output bit; a plurality of multiplexers having a plurality of input buses and from one to two output buses, the multiplexers connected between the arithmetic units, the compare units and the register file; and a plurality of demultiplexers having one input bit and a plurality of output bits, for delivery of a comparison result in a destination selection to corresponding arithmetic units within the s-paradigm unit;

forming the largest possible block in the s-paradigm unit in the course of assembler coding and introducing conditioned commands executed or jumped over on the basis of "decision" bits;

then buffer-storing configuration bits for subunits in a programmable structure buffer and loading the configuration bits into the s-paradigm unit during processing of the block; and defining the decision bits for governing a control flow by comparisons, for producing an optimum data flow translation in conjunction with comparators, in dynamic multiplexers as a sub-type of the arithmetic units.

* * * * *